United States Patent Office 2,981,656
Patented Apr. 25, 1961

2,981,656

GASTRIC ACID-COUNTERACTING COMPOSITION

Joseph W. E. Harrisson, Lansdowne, and Elias W. Packman, Philadelphia, Pa., assignors to LaWall & Harrisson, Philadelphia, Pa., a sole proprietorship No Drawing. Filed Nov. 7, 1955, Ser. No. 545,574

9 Claims. (Cl. 167—55)

The present invention relates to therapeutic products, particularly useful in preventing and alleviating ulceration in the stomach and in the duodenum in vertebrate animals, especially human beings.

A purpose of the invention is to prevent and relieve mucosal damage in the stomach and in the duodenum of human and other vertebrate animals.

A further purpose is to build up resistance of the stomach and duodenal mucosa against agents which may cause ulceration.

Further purposes appear in the specification and in the claims.

There is a serious need for an improved treatment of ulceration and conditions which may lead to ulceration of the stomach and duodenum, both in human and veterinary medicine. There is an especially serious need for such a treatment which can operate effectively.

Based upon animal experimentation, the present inventors have discovered that there is a synergistic effect of acid-counteracting aluminum compounds, bioflavonoids which may be derived from citrus fruit, and ascorbic acid in combating mucosal damage of the stomach and duodenum.

It has been known for some time that bioflavonoids are capable of strengthening the capillaries, and in some previous investigations, ascorbic acid has been found to be synergistic with bioflavonoid, it being believed that ascorbic acid and bioflavonoid exert a mutually protecting action upon one another.

It has been found, however, that in the prevention and cure of mucosal damage to the stomach and duodenum, a combination of bioflavonoid and ascorbic acid alone are not effective, the results from the combination being about the same as those obtained from ascorbic acid alone.

On the other hand, when an acid-counteracting aluminum compound is used conjointly with both bioflavonoid which may be derived from citrus fruit and ascorbic acid, the combination of the three ingredients is very pronouncedly effective, and markedly superior to the control, to any of the ingredients alone or to any combination of two of the ingredients.

The results obtained in the present invention are based upon a series of experiments carried out on guinea pigs. Ulcers were induced in the experimental animals by administering 50 milligrams of depot histamine per kilogram of body weight per day parenterally. In the case of the controls water was administered, but in the case of animals receiving treatment, the particular treatment as set forth in the table was administered along with ulcer-inducing histamine. Histamine was given intramuscularly, other agents orally.

Each series of experiments was carried on for ten days and the ulcer-inducing depot histamine administered once daily and the treatments were administered twice daily. At the end of the ten day period the experimental animals were sacrificed and the stomach and duodenal mucosa examined macroscopically for areas of damage.

The evaluation of the observations was as follows:

If a perforated ulcer was present, the specimen was given a value of 10.

If an unperforated ulcer was present, the specimen was given a value of 8.

If extensive hemorrhage or slight damage to the mucosa was visible the specimen was assigned a value of 4.

If "no" mucosal damage was evident but slight hemorrhage was evident the specimen was given a value of 1 or 2 depending upon the degree of hemorrhage.

If the stomach and duodenum were normal the specimen was given a value of zero.

In the experiments listed in the table, the quantities of ingredients fed per experimental animal weighing between 200 and 250 grams, per dose per day were as follows:

|  | Milligrams |
|---|---|
| Aluminum hydroxide | 25 |
| Hesperidin | 25 |
| Ascorbic acid | 25 |
| Aluminum sulphate | 25 |
| Rutin | 25 |

In the combined treatment the above quantity of each of the combined ingredients was administered.

*Table*

| Compounds | Aluminum Hydroxide | Hesperidin | Ascorbic Acid | Aluminum Hydroxide +Hesperidin | Aluminum Hydroxide +Rutin |
|---|---|---|---|---|---|
| Number of animal tests | 30 | 10 | 10 | 20 | 10 |
| Mean Degree of Ulceration | 5.1 | 6.0 | 5.50 | 6.80 | 5.10 |
| Index of Ulceration | 4.59 | 4.80 | 4.95 | 6.80 | 5.10 |
| Index of Protection | 1.89 | 1.68 | 1.53 | −.32 | 1.38 |

| Compounds | Aluminum Hydroxide + Ascorbic Acid | Hesperidin+ Ascorbic Acid | Aluminum Hydroxide +Hesperidin + Ascorbic Acid | Aluminum Sulphate+ Hesperidin+ Ascorbic Acid | Control Water |
|---|---|---|---|---|---|
| Number of animal tests | 20 | 20 | 50 | 10 | 50 |
| Mean Degree of Ulceration | 8.0 | 5.60 | 3.57 | 6.30 | 6.81 |
| Index of Ulceration | 8.0 | 4.76 | 2.45 | 6.30 | 6.32 |
| Index of Protection | −1.52 | 1.56 | 3.87 | −.11 | |

The table lists in the first horizontal column the treatment, if any, which included depot histamine as above in every case. The second horizontal column gives the number of animal tests conducted using the particular procedure. The figures in this column indicate the number of values which were averaged to give the mean degree of ulceration set forth in the third horizontal column. Of course it will be evident that the lower the mean degree of ulceration the greater the protective and alleviating effect of the treatment.

The index of ulceration set forth in the fourth horizontal column is obtained by multiplying the mean degree of ulceration by the percent of the animals tested in the particular group which showed ulceration. The index of ulceration is therefore a value which is a composite of the intensity of ulceration and the distribution or incidence of ulceration. It is therefore more representative of the benefit of a treatment than is the mean degree of ulceration.

The last horizontal column shows the index of protection which is equal to the index of ulceration of the control minus the index of ulceration of the particular experimental group. It is therefore the reverse of the index of ulceration, and in the index of protection the higher figure shows the greater protection.

The vertical columns illustrate samplings of more extensive data showing the effects of typical experimental treatments, primarily directed to one bioflavonoid which is typical of the others, and primarily concerned with one acid-counteracting aluminum compound which is typical of other such compounds.

It will be evident from study of the table that aluminum hydroxide alone, hesperidin alone and ascorbic acid alone exhibit slight protective value. Aluminum hydroxide plus hesperidin, and aluminum hydroxide plus rutin are of negligible protective value. Aluminum hydroxide plus ascorbic acid shows no benefit. Hesperidin plus ascorbic acid is of slight protective value.

In the light of this background it is amazing to note that aluminum hydroxide plus hesperidin plus ascorbic acid is of pronounced protective value, producing an index of ulceration which is 40 percent of the control and an index of protection which is more than twice that obtained by another treatment.

On the other hand, an aluminum compound such as aluminum sulphate which does not have the power of counteracting gastric acid when used with hesperidin and ascorbic acid produced no benefit over the control.

In many cases it will be preferable to use an aluminum compound, having the property of counteracting gastric acidity, which is water insoluble, having a solubility in water of less than 0.1 percent. In some cases, however, the aluminum compound having the property of counteracting gastric acidity may be water soluble, that is, having a solubility greater than that above set forth.

The aluminum compound to counteract the gastric acidity may be a gastric acid neutralizing compound such as aluminum hydroxide, aluminum carbonate, dihydroxyaluminum amino acetate, dihydroxyaluminum sodium carbonate, dihydroxyalminum lactate or any equivalent, or it may be a gastric acid adsorbing compound such as aluminum magnesium silicate or aluminum sodium silicate, or other aluminum-containing silicates such as kaolin, bentonite, or fuller's earth.

All of the compounds mentioned in the preceding paragraph are water insoluble, except dihydroxyaluminum lactate, which is water soluble.

It will of course be evident that where desired the acid-counteracting aluminum compound may actually be a mixture of water soluble and water insoluble compounds, or a mixture of acid-counteracting neutralizing compound and acid-counteracting adsorbing compound, or may be a mixture of water soluble and water insoluble and neutralizing and adsorbing compounds, as desired. It will of course also be understood that two or more such water soluble compounds, or two or more such water insoluble compounds or two or more neutralizing or two or more adsorbing compounds may be used as desired.

The bioflavonoid may be any one of the bioflavonoids which may be obtained from citrus fruit. Suitable examples of bioflavonoids which may be derived from citrus fruit which may be used in the present invention are: hesperidin, lemon bioflavonoid complex, naringin, naringenin, hesperetin, hesperidin methyl chalcone, naringin methyl chalcone, eriodictyol, catechin, aglycone esculetin, flavones, flavonols and flavonones. One of the preferred bioflavonoids which may be derived from citrus fruit is a crude commercial mixture of bioflavonoids which is known to contain appreciable quantities of hesperidin.

The bioflavonoids are well described along with their recognized prior art uses, in Miner, Bioflavonoids and the Capillary, 61 Annals of the New York Academy of Sciences, Article 3, pages 637–736, especially pages 639–651 (July 8, 1955).

When administering the combination of acid-counteracting aluminum compound, bioflavonoid which may be derived from citrus fruit, and ascorbic acid to human beings, the single dose for an adult to be taken after meals and at bedtime is recommended as follows:

In the case of a water insoluble acid-counteracting aluminum compound which is a gastric neutralizing compound, the human dose should be from 0.1 to 1 gram and preferably about 0.5 gram. In the case of such a compound which is water soluble, the human dose may be as just stated, but due consideration should be given to adjustment of the dose according to the gastric acid neutralizing power of the particular compound.

If the acid-counteracting aluminum compound is a gastric acid adsorbing compound, the quantity recommended per dose is 0.5 to 2.5 grams, preferably about 1.5 grams. The quantity of bioflavonoid which may be derived from citrus fruit, should be between 0.05 and 0.5 gram, preferably about 0.1 gram. The quantity of ascorbic acid used should be between 0.05 and 0.5 gram and preferably about 0.1 gram.

In the case of children the dose should be prorated according to the severity of the condition.

In veterinary medicine the dose should be determined by the relationship between the animal digestive system and the human digestive system in respect to gastric acidity and quantity of gastric acid, and should be reduced or increased accordingly, as well known in veterinary medicine.

The combination of acid-counteracting aluminum compound, bioflavonoid which may be derived from citrus fruit and ascorbic acid will preferably be combined in a tablet, a powder or a capsule, administered with or without water as desired, and ordinarily administered by mouth, or it may be administered in the form of a magma.

The following states a theory of the operation of the invention, it being understood that the theory is stated without prejudice and without predicating the disclosure of the invention on the validity of the theory.

Let us assume that certain gastric ulcers without considering the basic motivating factors are produced by a dual mechanism. There is first, the interaction of excess gastric acidity on the stomach wall and secondly, some interference in normal blood supply to the stomach wall. The latter may be a result of vasoconstriction or may be due to the eroding effect of the excess gastric acid upon the wall of the stomach and the capillaries supplying it.

A drug combination containing an acid-counteracting aluminum compound together with bioflavonoid and ascorbic acid exerts a therapeutic or preventative effect.

The aluminum type compound may furnish both an antacid and astringent effect which in themselves will decrease the volume of gastric juice and "neutralize" excess acid. In contrast the bioflavonoid and ascorbic acid have a well known effect in strengthening the capillaries so that their normal integrity is maintained.

Since, however, the triple combination is so far superior to any other combination of the ingredients, it is probable that a synergism of unknown mechanism is also responsible for the "anti-ulcer" property of this drug combination.

Thus, by reason of mechanisms outlines, the combination of an acid-counteracting aluminum compound together with bioflavonoid which may be derived from citrus fruit and ascorbic acid appears to be a rational therapy in the treatment and prevention of gastric and duodenal ulcers.

In view of our invention and disclosure variations and modifications to meet individual whim or particular need will doubtless become evident to others skilled in the art, to obtain all or part of the benefits of our invention

Having thus described our invention, what we claim as new and desire to secure by Letters Patent is:

1. A therapeutic product comprising nontoxic gastric acid-counteracting aluminum compound, a bioflavonoid which may be derived from citrus fruit, and ascorbic acid.

2. A therapeutic product according to claim 1, in which the nontoxic gastric acid-counteracting aluminum compound is water insoluble.

3. A therapeutic product according to claim 1, in which the nontoxic gastric acid-counteracting aluminum compound is water soluble.

4. A therapeutic product according to claim 1, in which the nontoxic gastric acid-counteracting aluminum compound is a gastric acid neutralizing compound.

5. A therapeutic product according to claim 4, containing in a single human dose between 0.1 and 1 gram of nontoxic gastric acid neutralizing compound, between 0.05 and 0.5 gram of bioflavonoid which may be derived from citrus fruit, and between 0.05 and 0.5 gram of ascorbic acid.

6. A therapeutic product according to claim 5, containing in a single human dose about 0.5 gram of nontoxic gastric acid neutralizing compound, about 0.1 gram bioflavonoid which may be derived from citrus fruit, and about 0.1 gram of ascorbic acid.

7. A therapeutic product according to claim 1, in which the nontoxic gastric acid-counteracting aluminum compound is a gastric acid adsorbing compound.

8. A therapeutic product according to claim 7, containing in a single human dose between 0.5 and 2.5 grams of nontoxic gastric acid adsorbing compound, between 0.05 and 0.5 gram of bioflavonoid which may be derived from citrus fruit and between 0.05 and 0.5 gram of ascorbic acid.

9. A therapeutic product according to claim 8, containing in a single human dose about 1.5 grams of nontoxic gastric acid adsorbing compound, about 0.1 gram of bioflavonoid which may be derived from citrus fruit, and about 0.1 gram of ascorbic acid.

References Cited in the file of this patent

U.S. Dispensatory, 25th Ed., 1955, Lippincott Co., Philadelphia, Pa., pp. 56–58.

U.S. Dispensatory, 24th Ed., Lippincott Co., pp. 55 and 1575.

Griffith: "Rutin and Related Flavonoids" (1955), Mack Company, Easton, Pa., pp. 110 to 112, and 118 to 121.

"Appraisal of Drugs Intended to Alter Subjective Responses, Symptoms," H. K. Beecher, Journal of American Medical Association, June 4, 1955, pages 399 to 401.

"Errors of Medical Studies," G. L. Saiger, Journal of American Medical Association, June 11, 1960, pages 678 to 681.

75 Surgery, Gynecology and Obstetrics (1942), pages 170 to 182, "The Experimental Production of Gastric and Duodenal Ulcers in Laboratory Animals by the Intramuscular Injection of Histamine-in-Beeswax," by Hay, Varco, Gode and Wangensteen.

U.S. Pharmacopeia (15th Revision), pages 35 and 36.